SCANNING SYSTEM

Filed Nov. 5, 1962 5 Sheets-Sheet 1

INVENTORS
WILLIAM R. ARSENAULT
JOHN F. CAMERON
BY Allen E. Botney
ATTORNEY

WILLIAM R. ARSENAULT
JOHN F. CAMERON
INVENTORS

BY Allen E. Bothey

ATTORNEY

SCANNING SYSTEM

Filed Nov. 5, 1962 5 Sheets-Sheet 3

INVENTORS
WILLIAM R. ARSENAULT
JOHN F. CAMERON
BY Allen E. Botney
ATTORNEY

SCANNING SYSTEM

INVENTORS
WILLIAM R. ARSENAULT
JOHN F. CAMERON
BY
Allen E. Botney
ATTORNEY

SCANNING SYSTEM

Filed Nov. 5, 1962 5 Sheets-Sheet 5

INVENTORS
WILLIAM R. ARSENAULT
JOHN F. CAMERON
BY Allen E. Botney
ATTORNEY

United States Patent Office 3,342,978

Patented Sept. 19, 1967

3,342,978
SCANNING SYSTEM

John F. Cameron, Rolling Hills, and William R. Arsenault, Pacific Palisades, Calif., assignors to FMA, Inc., El Segundo, Calif., a corporation of California Filed Nov. 5, 1962, Ser. No. 235,492
6 Claims. (Cl. 235—61.11)

The present invention relates in general to an information storage and retrieval system and more particularly relates to a scanning technique therefor.

In one kind of information storage and retrieval system, the information, whether it be the page of a document or other graphic material, is stored on a reel of film by recording the information on successive frames of the reel. Binary-coded data describing and, therefore, identifying the information is recorded in each frame in the margin adjacent the information. In retrieving any portion of the stored information, binary-coded data identifying the desired information is fed into the system, usually in the form of a punched card, and is there sequentially compared with the identifying blocks of coded data on the film reel. The desired information is provided when a match is obtained between the two code blocks.

In conducting the abovesaid comparison, the rows of binary bits constituting the blocks of coded data are scanned in succession, the binary bits in each row likewise being scanned serially. A single scan trace has been used in the past for this purpose, that is to say, the scan period has been kept constant. Since the space between rows is therefore also fully scanned, as well as the space between frames, it will at once be apparent that the scanning process heretofore employed is inefficient in that it requires an undue amount of time. It thereby sets an upper limit on the film speed and, therefore, on the average, increases the amount of time required for information retrieval.

According to the invention, a dual scan technique is employed that has several advantages associated with it. First, time is saved, thereby permitting higher film speeds which, in turn, allows for more rapid information retrieval. Furthermore, as will be obvious to those familiar with the problems encountered in this art, by having the scan pattern seek out the position of the code on the film, problems posed by film shrinkage and stretching are minimized, and requirements on mechanical alignment tolerances are relaxed considerably.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only and are not intended as a definition of the limits of the invention.

Figure 3:
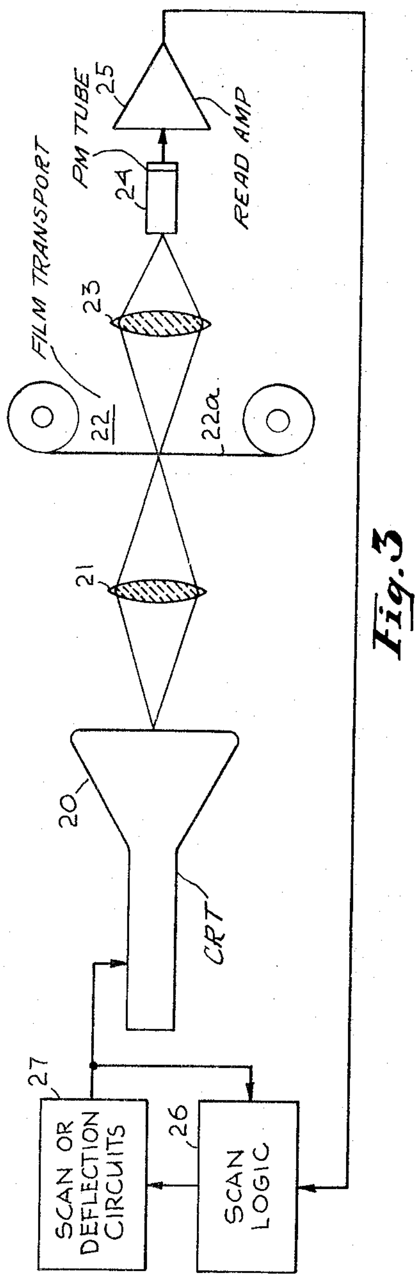
FIGURE 3 is a block diagram of circuitry for selectively providing dual scan traces.
Figure 5:
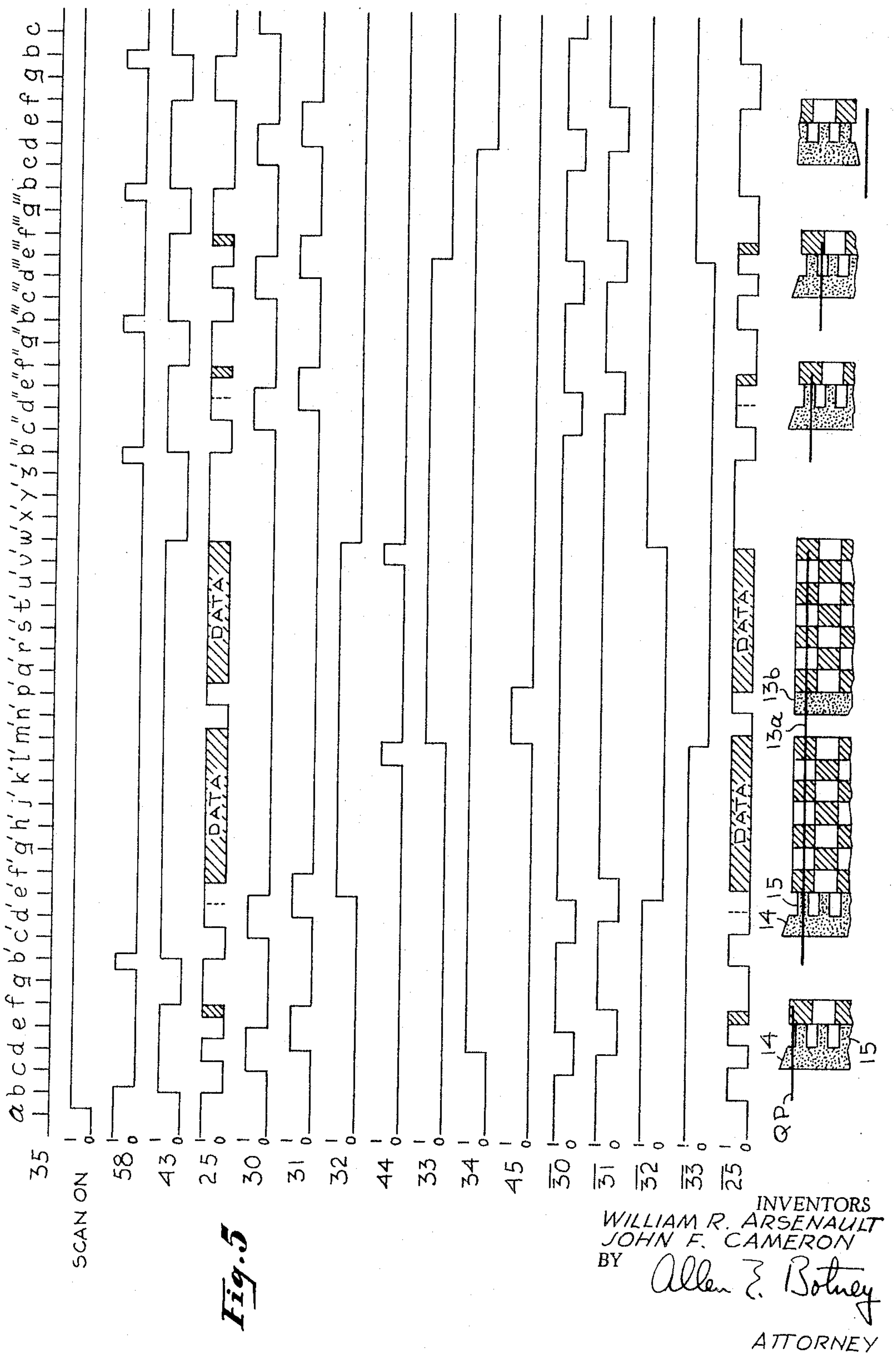
Figure 4A:
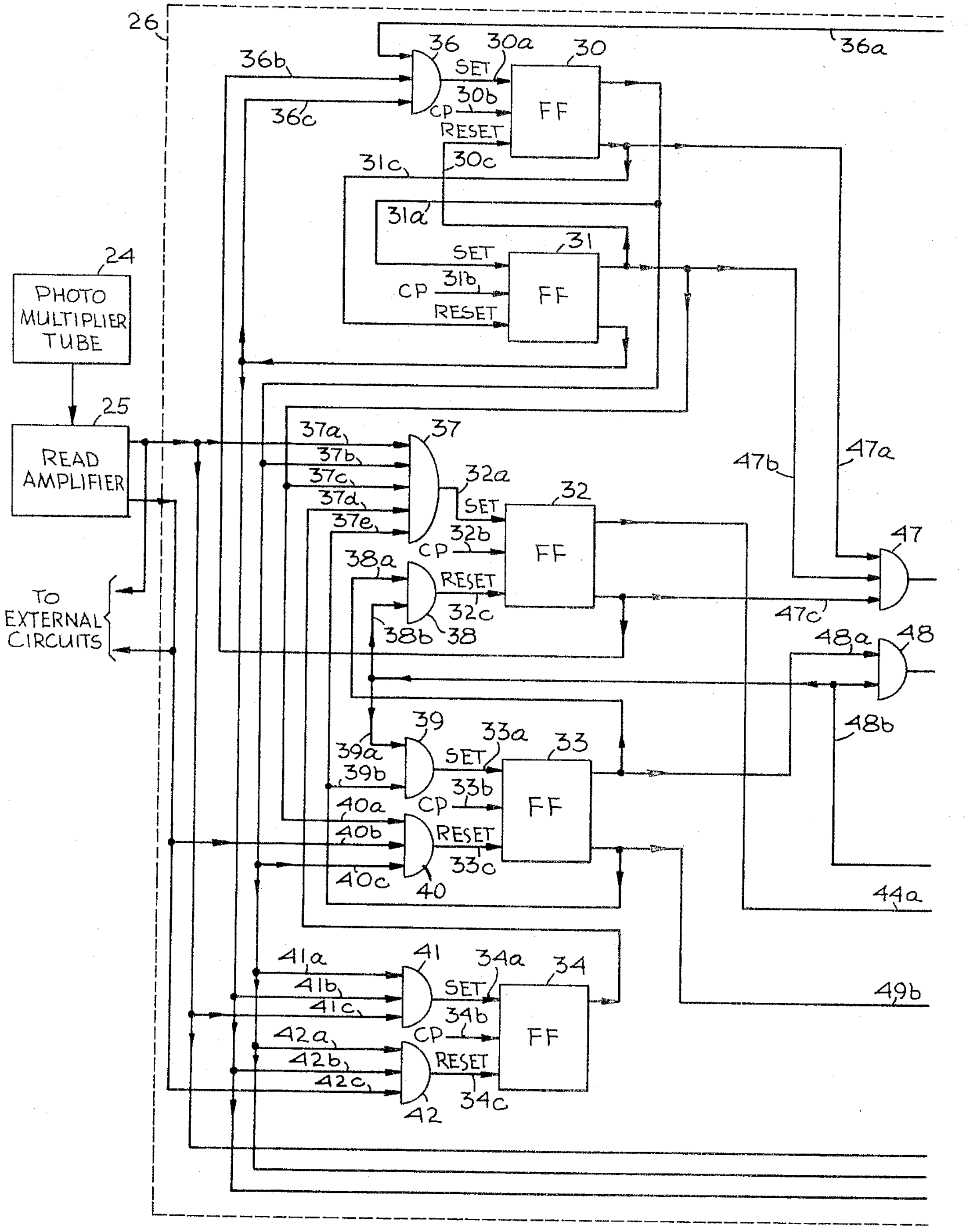
Figure 4B:
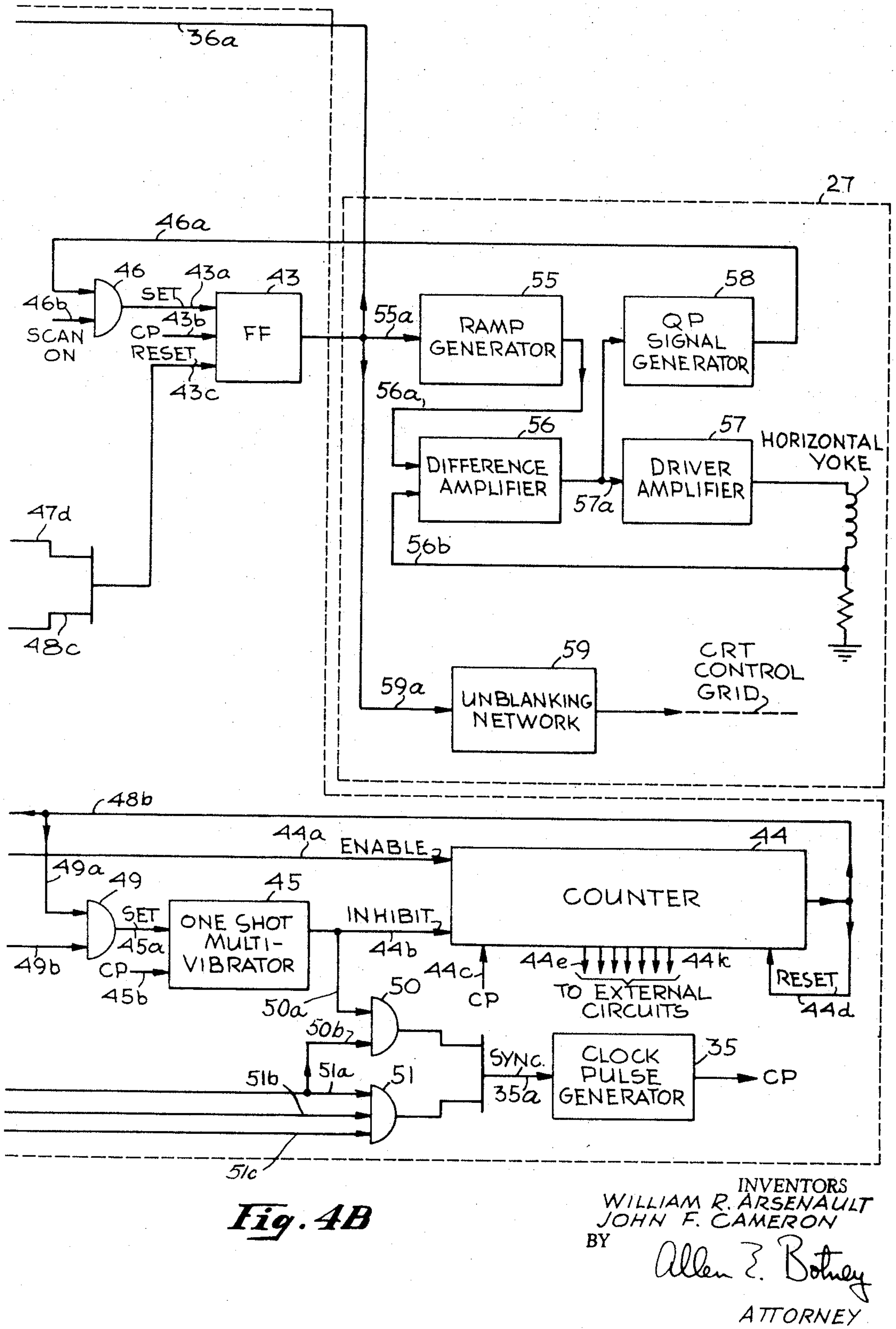

FIGURES 4*a* and 4*b*, in combination, present a detailed block diagram of the scan logic and scan circuit blocks in the diagram of FIG. 3; and FIGURE 5 is a flow chart illustrating the waveforms appearing at different points in the circuitry of FIG. 4.

Figure 1:
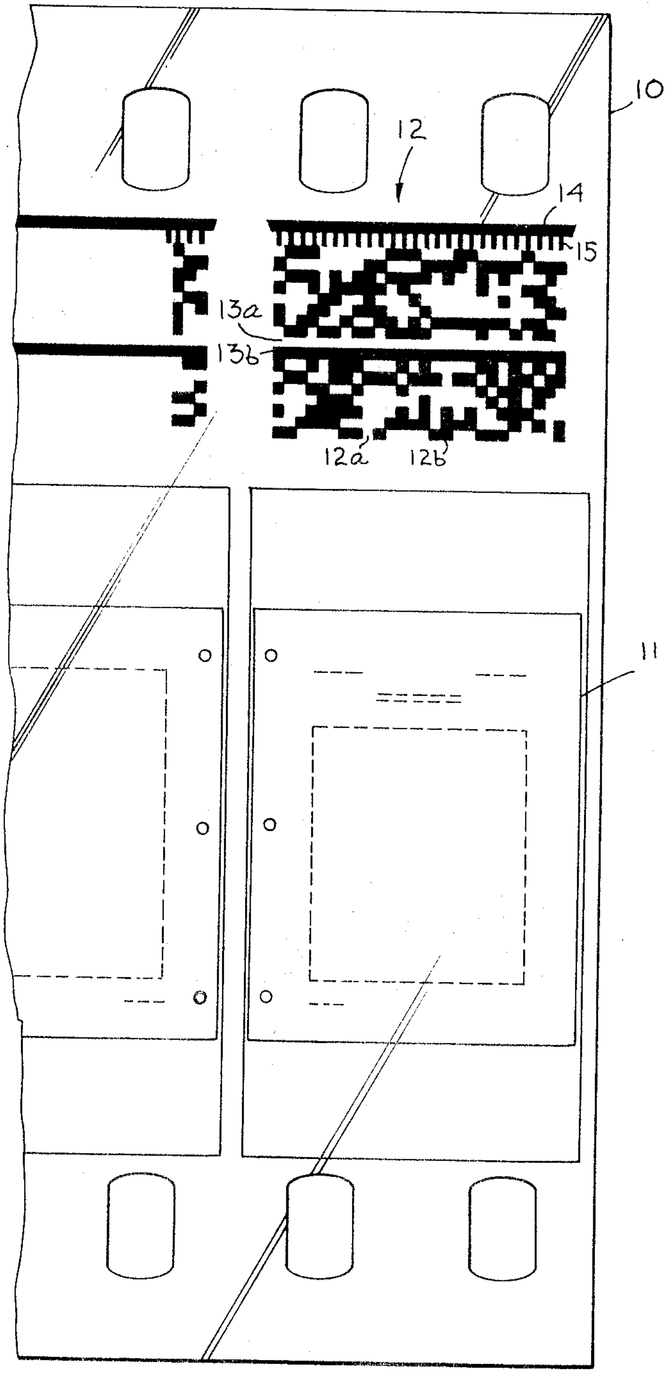
FIGURE 1 shows a film on which pages of information are recorded in frames and on which are also recorded, alongside the page, a block of binary-coded data that describe and identify the contents of the page.

Reference is made to FIG. 1 wherein a frame of film 10 is shown on which a page of information 11 is recorded, as well as a block of binary-coded data, generally designated 12, in the margin of the film frame alongside the page. Code block 12 includes a large number of transparent and opaque dots or areas preferably arranged in columns and rows constituting the binary bits of the code. By way of example, numerals **12*a* and 12*b*, respectively, designate transparent and opaque areas. Running through the middle of the code and, therefore, dividing the code into two equal parts, are a pair of vertical bars or columns 13*a* and 13*b*, one alongside the other, bar 13*a* being transparent and bar 13*b* being opaque. As will be seen later, these bars are used to rephase certain clock pulses that may be used in the scanning process. To one side of code block 12 is another opaque vertical bar or frame marker 14, a plurality of timing marks or flags 15 being interposed between bar 14 and the binary bits of code block 12. Flags 15 are preferably opaque and considerably narrower than binary bit areas 12*a* and 12*b***. Furthermore, there are as many of these flags as there are rows of code and they are respectively positioned so as to be centered in these rows. Since the spacings between the flags are transparent, the entire flag arrangement takes on a step-ladder appearance, as is shown in the figure.

Figure 2:
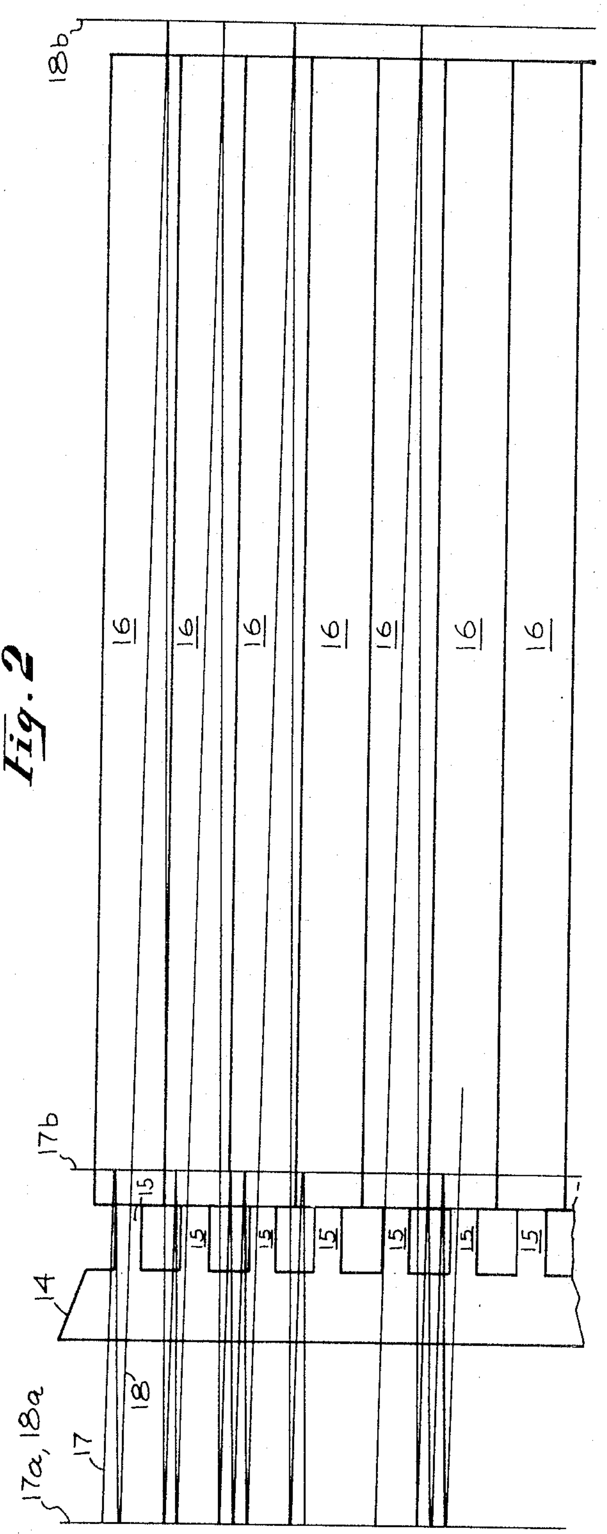
FIGURE 2 is a diagram illustrating the dual scan technique of the present invention.

Reference is now made to FIG. 2 wherein an enlarged and simplified version of the code block and its associated features are presented. More specifically, rectangular bars, such as bars 16, have been substituted for and respectively represent the rows of code and, furthermore, in order that the scan traces may effectively be superimposed upon them, frame marker 14, flags 15, and the abovesaid rectangular bars 16 are merely presented in outline form. The short scan or sweep is designated 17, the limits thereof being designated **17*a* and 17*b*. The long scan or sweep, on the other hand, is designated 18, its limits similarly being designated 18*a* and 18*b*. As may be seen from the figure, 17*a* and 18*a* are the same point. Point 17*a*, 18*a*** is known as the quiescent point.

It will also be noticed from FIG. 2 that a scan or sweep commences at position **17*a* or 18*a* and proceeds across frame marker 14 toward the code. If the sweep does not encounter a time mark or flag 15, it continues on to position 17*b* and then retraces, that is, the sweep returns to starting position 17*a*, at which time the sweep begins again. The cycle described constitutes the short sweep and is designated by numeral 17, as previously mentioned. If, on the other hand, the sweep does encounter a flag 15, it continues on to position 18*b* before returning to starting position 18*a*, thereby sweeping across or scanning a bar 16** which, as heretofore mentioned, represents a row of code. The mechanics of this dual sweep technique will be described later in much greater detail but it will nevertheless be recognized from this brief description of it that a substantial amount of time is saved since the long or full sweep is taken only when a row of code is in the sweep path.

Attention is now directed to FIG. 3 wherein a functional block diagram of the scanning apparatus of the present invention is shown. The apparatus includes a cathode-ray tube 20; a lens arrangement 21 mounted between tube 20 and a film transport generally designated 22, the film transport including a reel of film **22*a*; a second lens arrangement 23 mounted on the other side of film 22*a*; a photomultiplier tube 24 mounted between lens 23 and a read amplifier 25 to which the photomultiplier is coupled; a scan logic network 26; and an arrangement of scan or deflection circuits 27. With respect to the latter two, scan logic 26 is connected between read amplifier 25 and scan circuits 27 whose outputs are fed both to cathode-ray tube 20 and to scan logic 26**.

In considering the operation of the FIG. 3 arrangement, it should be noted initially that cathode-ray tube 20 is employed as a flying-spot scanner, by which is meant that a small spot of light is developed on the face of the tube and swept across it at a predetermined rate. Flying-spot scanners are well-known in the art. The spot of light is passed through lens 21 which converges the light to substantially a point and focuses it on film 22*a*. A fine point of light is thereby moved or swept across the face of the film, light passing through the film to lens arrangement 23 only when the abovesaid point of light is projected against a transparent area on the film. In other words, a discontinuous beam of light is passed to lens 23, the interruptions depending on whether or not the point of light moving across film 22*a* is at any instant projected against a frame marker, a timing mark or flag, or an opaque binary bit. The intermittent light beam is concentrated by lens arrangement 23 onto photomultiplier tube 24 which, as is well known, produces a variable voltage output in response thereto whose variations correspond to the fluctuations in the aforesaid light beam. After being amplified in read amplifier 25, this waveform is applied to scan logic 26 wherein it is used to determine whether or not the point of light has encountered a flag 15 and, therefore, whether or not to permit a long or full scan. If it is determined that a long scan should occur, then scan or deflection circuits 27 are so informed by a suitable signal from scan logic 26, as a result of which circuits 27 apply the appropriate deflection signals to cathode-ray tube 20. A row of code is then "read out," after which the system immediately returns to the short scan.

Reference is now made to FIGS. 4*a* and 4*b* wherein scan logic 26 and deflection circuit 27 are shown in detail, photomultiplier tube 24 and read amplifier 25 also being shown for purposes of clarity. Among other things, scan logic 26 includes a plurality of five flip-flop circuits respectively designated 30–34, the signals to the flip-flops being fed, basically, by a clock-pulse generator 35 as well as by a plurality of AND gates respectively designated 36–42. More specifically, AND gate 36 has three input terminals, one input terminal being connected via line 36*a* to the output end of a scan-control flip-flop 43, a second input terminal being connected via line 36*b* to one of two output terminals from flip-flop 32, and the third being connected via line 36*c* to one of two output terminals from flip-flop 31. The output of AND gate 36 is connected via line 30*a* to the first of three input terminals to flip-flop 30, a second of its input terminals being connected via a line 30*b* to receive the signals from clock pulse generator 35. Finally, the third input terminal to flip-flop 30 is connected via line 30*c* to the other of the two outputs from flip-flop 31. Lines 30*a* and 30*c* are respectively designated as SET and RESET lines since, as the terms imply, signals on these lines either set or reset the flip-flop, as will more fully be seen later. On the other hand, line 30*b* is designated CP which is an abbreviation for clock pulses.

Considering flip-flops 31 and 32 and also AND gates 37 and 38 associated with flip-flop 32, the two outputs from flip-flop 30 are respectively connected via lines 31*a* and 31*c* to two of three inputs to flip-flop 31, the third input to this flip-flop connecting via line 31*b* to clock-pulse generator 35. As before, the three lines leading into flip-flop 31 are respectively indicated as SET, CP, and RESET lines. AND gate 37 has five input lines respectively designated 37*a*–37*c*, whereas AND gate 38 has only two input lines respectively designated 38*a* and 38*b*. Line 37*a* is connected directly to one of the two outputs from read amplifier 25, while line 37*b* connects to the first of the two outputs associated with flip-flop 30. In a like manner, line 37*c* is connected to the first of the two outputs from flip-flop 31, line 37*d* is connected to the sole output terminal of flip-flop 34, and line 37*e* is connected to the second of the two outputs from flip-flop 33. As for lines 38*a* and 38*b* feeding into AND gate 38, they are respectively connected to the first output from flip-flop 33 and to the output from a modulus 7 counter designated 44. The signals out of AND gates 37 and 38 are fed into flip-flop 32 via lines 32*a* and 32*c*, a third line 32*b* being used to apply clock pulses to the flip-flop from clock-pulse generator 35. Here again, lines 32*a*–32*c* are respectively designated SET, CP, and RESET.

With respect to flip-flop 33 and associated AND gates 39 and 40, AND gate 39 has two input terminals, and lines to which are respectively designated 39*a* and 39*b*. Line 39*a* connects to the output of modulus 7 counter 44, whereas line 39*b* is connected to the second of the two output terminals of flip-flop 33. As for AND gate 40, it has three input terminals and the lines to them are respectively designated 40*a*–40*c*. Line 40*a* is connected to receive the first output from flip-flop 31, line 40*b* is connected to the second output terminal of read amplifier 25, and line 40*c* is connected to receive the first output from flip-flop 30. The output ends of gates 39 and 40 are respectively connected via lines 33*a* and 33*c* to flip-flop 33. A third line into the flip-flop, line 33*b*, is connected to clock-pulse generator 35. The three lines into flip-flop 33 are similarly shown as SET, CP, and RESET lines in FIG. 4*a*.

Finally, with regard to flip-flop 34 and its associated AND gates 41 and 42, each of the AND gates has three input terminals, the lines thereto respectively being designated 41*a*–41*c* and 42*a*–42*c*. Lines 41*a* and 42*a* are both connected to the first output of flip-flop 30. Similarly, lines 41*b* and 42*b* are both connected to the second output of flip-flop 31. Lines 41*c* and 42*c*, on the other hand, are respectively connected to the two outputs of read amplifier 25. As in the previous cases, the outputs from AND gates 41 and 42 respectively feed into two of the three input terminals of flip-flop 34 via lines 34*a* and 34*c*, the third line to the flip-flop, designated 34*b*, being connected to receive the clock pulses from clock-pulse generator 35. As may be expected, lines 34*a*–34*c* are respectively indicated as SET, CP, and RESET lines.

Scan logic 26 of FIG. 3 further includes a one-shot multivibrator 45 and another plurality of AND gates respectively designated 46–51. Considering AND gotes 47 and 48 first, gate 47 has three input terminals as indicated by lines 47*a*–47*c* and gate 48 has two input terminals as indicated by lines 48*a* and 48*b*. Lines 47*a* and 47*c* feeding into gate 47 are respectively connected to the second output terminals of flip-flops 30 and 32, whereas line 47*b* is connected to the first output terminal of flip-flop 31. As for gate 48, its input line 48*a* is connected to the first output from flip-flop 33 and its input line 48*b* is connected to the output end of counter 44. The two output lines from AND gates 47 and 48, respectively designated 47*d* and 48*c*, are joined to a single line 43*c* which feeds into the third of three inputs to flip-flop 43. The first two lines into flip-flop 43 are designated 43*a* and 43*b*. They are respectively connected to the output ends of gate 46 and clock-pulse generator 35. AND gate 46 has two input lines designated 46*a* and 46*b*, line 46*a* being connected to a circuit in scan or deflection circuits 27, as will be described below, and line 46*b* being connected to a circuit external to the scanning system and, hence, is not shown. Briefly stated, however, line 46*b* receives a signal from this external circuit which puts the scanning system into operation and for this reason line 46*b* is indicated as SCAN ON.

Attention is now directed to the combination of multivibrator 45 and AND gate 49. As shown, the gate and multivibrator each have a pair of input lines, the lines to the AND gate respectively being designated 49*a* and 49*b* and the lines to the multivibrator respectively being designated 45*a* and 45*b*. Line 49*a* is connected to the output end of modulus 7 counter 44 while line 49*b* is connected to receive signals developed at the second output terminal of flip-flop 33. Line 45*a*, on the other hand, is connected to the output of AND gate 49 and line 45*b* is connected to receive the clock pulses generated by clock-pulse generator 35. It should also be noted at this point that clock pulses are applied to counter 44 as well via line 44*c* and that the output from the counter is fed back to itself via a RESET line designated 44*d*. Counter 44 has a pair of input lines that are respectively marked ENABLE and INHIBIT and designated 44*a* and 44*b*, line 44*a* being connected to the first output terminal of flip-flop 32 and line 44*b* being connected to the output end of multivibrator 45. The counter also has a group of 7 output lines designated 44*e*–44*k*. These are fed to external circuitry not included in the invention but which may be a part of an information storage and retrieval system. Finally, clock-pulse generator 35 has a single input line marked SYNC which is designated 35*a* and which is joined to the outputs of both AND gates 50 and 51, the former, namely, gate 50, having a pair of input lines respectively designated 50*a* and 50*b* and the latter, namely, gate 51, having a set of three input lines respectively designated 51*a*–51*c*.

Having thus described scan logic 26, reference is now made to scan or deflection circuits 27 which, in FIG. 4*b*, is shown to include a ramp generator 55, a difference amplifier 56, a drive amplifier 57, a quiescent point signal circuit 58 and an unblanking network 59. The horizontal yoke, the feedback resistor connected to it, and the control grid, while important to the deflection circuits, are more properly a part of cathode-ray tube 20 in FIG. 3. Ramp generator 55 is connected between flip-flop 43 in scan logic 26 and the first of the two inputs to difference amplifier 56. The line feeding into the ramp generator is designated 55*a* whereas the first input line to the difference amplifier is designated 56*a*. Connected between difference amplifier 56 and the input end of the horizontal yoke is driver amplifier 57, its input line being designated 57*a*. The output end of the yoke, that is, the junction point between the yoke and the feedback resistor, is connected via line 56*b* back to the input end of difference amplifier 56 and this line constitutes the second input to the amplifier. As for quiescent point signal circuit 58 and unblanking network 59, circuit 58 is connected between difference amplifier 56 and first input 46*a* to AND gate 46 in scan logic 26, while network 59 is connected between flip-flop 43 in the scan logic and the cathode-ray tube control grid.

In considering the operation of the FIG. 4 circuitry, reference is made to FIG. 5 wherein the voltage waveforms appearing in these circuits are presented. The abovesaid waveforms are numerically designated at their ends, the numerals by which they are designated respectively corresponding to the numerical designations for the circuits that produce them so as to facilitate identification. The only exception to the rule is in connection with the SCAN ON waveform which is designated SCAN ON rather than by a numeral because as previously mentioned, the circuit that produces it is external to the scanning system. Furthermore, since some of the circuits, such as the flip-flops, produce two waveforms that are complements or mirror images of each other, in those cases the numerical designations for the two waveforms are the same but with one waveform being distinguished from the other by a bar (—) placed over the numeral designating it. Finally, it should be noted that portions of the code and scan traces are reproduced beneath the waveforms in order to facilitate an understanding of the operation and that these code and scan reproductions are synchronized to the waveforms.

Accordingly, initially, when the SCAN ON signal is in the false or "0" state, all control flip-flops, that is, flip-flops 30–34 and flip-flop 43, are likewise in their false or "0" state. Stated differently, at the time of occurrence of clock pulse *a* in waveform 35, signals 30–34 and signal 43 are at the "0" level while signals $\overline{\mathbf{30}}$–$\overline{\mathbf{34}}$ and signal $\overline{\mathbf{43}}$ are at the true or "1" level. At this same time, the cathode-ray tube beam is OFF so that there is no light on photo-multiplier tube 24, which causes signal 25 out of read amplifier 25 to be true or in the "1" state and complementary signal $\overline{\mathbf{25}}$ to be false or in the "0" state. Were the beam on, however, it would be at its quiescent point position, thereby indicating that signal 58 out of quiescent point signal circuit 58 is, during this first stage of the operation, at the true or "1" level, as is shown in FIG. 5.

With signal 58 on input line 46*a* in the "1" state when the SCAN ON signal is turned ON or, stated differently, flipped to the "1" state, the SET signal out of AND gate 46 and applied to input line 43*a* of flip-flop 43 is also triggered into the "1" state. Consequently, at the first clock pulse to be applied to flip-flop input line 43*b* after the SCAN ON signal is turned on, namely, clock pulse *b* in waveform 35, the SET gate for flip-flop 43 is true and at that time waveform 43 out of the flip-flop will go to the "1" state. Waveform 43 is applied both to ramp generator 55 and to unblanking network 59. As a result the cathode-ray tube beam is turned on and, simultaneously, it is started moving across the face of the tube. As soon as the beam moves off the quiescent position, signal 58 out of quiescent point signal circuit 58 goes to the "0" state. Also, with the beam turned on and photo-multiplier tube 24 therefore receiving light, the outputs of read amplifier 25 reverse themselves, waveform 25 going to the "0" level and waveform $\overline{\mathbf{25}}$ going to the "1" level.

With signal 43 out of flip-flop 43 at the "1" level, and with signals $\overline{\mathbf{31}}$ and $\overline{\mathbf{32}}$ out of flip-flop 31 and 32, respectively, also at the "1" level, then the signals on lines 36*a*–36*c* of AND gate 36 are all at the "1" level, with the result that the SET signal out of the AND gate and applied to line 30*a* of flip-flop 30 is now also at the "1" level. Hence, when clock pulse *c* occurs in waveform 35, flip-flop 30 is set to the "1" state which means that waveform 30 goes to the "1" level at this time while complementary waveform $\overline{\mathbf{30}}$ goes to the "0" level.

As the beam continues to move across the film, it intercepts frame marker 14, with the result that the light going to photo-multiplier tube 24 is interrupted or blanked, thereby causing read amplifier 25 to go once again to a "true" state. Stated differently, signal 25 goes to a "1" level and signal $\overline{\mathbf{25}}$ goes to a "0" level. This occurs between clock pulses *c* and *d* in timing waveform 35 out of clock-pulse generator 35. With signals 25, 30, and $\overline{\mathbf{31}}$ at the "1" level applied to lines 41*a*–41*c* at the input to AND gate 41, the SET signal produced by gate 41 in response thereto and appearing on input line 34*a* of flip-flop 34 is likewise at the "1" level. Accordingly, when clock pulse *d* of waveform 35 is applied to line 34*b* of the flip-flop, the flip-flop will go to the true state, which means that its signal 34 will go to the "1" level. Also, since signal 30 on line 31*a* of flip-flop 31 is at the "1" level, the occurrence of clock pulse *d* on line 31*b* of flip-flop 31 causes this flip-flop to be set to the true state, whereby signal 31 goes to the "1" level and its complementary signal $\overline{\mathbf{31}}$ goes to the "0" level. It will be recognized that the output of flip-flop 34 may, at this time, be used in external logic to indicate the presence of a frame for counting, control, or other purposes.

At the next clock pulse to occur, namely, clock pulse *e*, flip-flops 30 and 31 are both, as explained above, in the "1" or true state so that signals 30 and 31 are at the "1" level and signals $\overline{\mathbf{30}}$ and $\overline{\mathbf{31}}$ at the "0" level. It is at this time that the logic examines the state of read amplifier 25 to determine if a flag 15 is present. If a flag is not present, then the short scan 17 (see FIG. 2) will be produced. On the other hand, if a flag 15 is present, then the long scan 18 (see FIG. 2) will be produced and a row of code thereby read out. The examination is made at AND gate 37 whereat signals 25, 30, 31, 34 and $\overline{\mathbf{33}}$ are respectively applied to lines 37*a*–37*e*. With signals 30, 31, 34 and $\overline{\mathbf{33}}$ all at the "1" level, whether or not a short or long scan will be produced depends on the state of read amplifier 25 which, in turn, depends on whether or not a flag 15 is present. Since a flag is not present at this point in the description, light impinges on photo-multiplier tube 24 and read amplifier 25 is, consequently, in a false or "0" and "1" state, which means that signals 25 and $\overline{25}$ are respectively at the "0" and "1" levels. Hence, with signal 25 on line 37$a$ at the "0" level, no output is produced by gate 37 and flip-flop 32 remains in its false state, as a result of which signal 32 remains at the "0" level and signal $\overline{32}$ remains at the "1" level.

Looking now to AND gate 47, it is seen that signals 31 and $\overline{32}$ on input lines 47$b$ and 47$c$, respectively, are at the "1" level. Since flip-flop 30 is reset to the false state at the time of occurrence of clock pulse $e$ (it will be noted that signal 31 at the "1" level is being applied to line 30$c$), signal $\overline{30}$ goes to the "1" level at that time. Hence, the signal on input line 47$a$ is also at the "1" level. With all three inputs to AND gate 47 at the "1" level, a react signal is applied to flip-flop 43 via line 43$c$, with the result that signal 43 goes to the "0" level when clock pulse $f$ is thereafter also applied to the flip-flop on its input line 43$b$. With signal 43 at the "0" level, the input to ramp generator 55 and unblanking network 59 is also zero. Hence, the cathode-ray tube beam and the ramp generator are turned off at this time and a return is made to the quiescent position. When the beam reaches the quiescent point, signal circuit 58 again becomes true shortly thereafter, with the result that signal 58 goes to the "1" state shortly after the occurrence of clock pulse $g$, as may be seen from the waveforms in FIG. 5. Also, during the time the beam is blanked and retracing occurs, no light is incident upon photo-multiplier tube 24 so that read amplifier 25 returns to the "1" state and its signals 25 and $\overline{25}$ to the "1" and "0" levels, respectively.

At clock time $b'$, the same conditions exist that existed at clock time $b$, that is to say, signal 58 and the SCAN ON signal are once again at the "1" level. Thus, the output of gate 46 is at the "1" level and flip-flop 43 is set to the true state, thereby returning signal 43 to the "1" level. At this time, therefore, the beam will become unblanked for the reasons previously explained and once again start moving across the film. During the interval between clock pulses $b'$ and $e'$, the same sequence of events occur as previously occurred in the interval between clock pulses $b$ and $e$. Accordingly, to avoid being redundant, this sequence will not be repeated here. Suffice it to say, therefore, that at the time of occurrence of clock pulse $e'$ in waveform 35, flip-flops 30, 31 and 34 are in the true state whereas flip-flop 33 is in the false state, and the logic once again looks for a flag 15. Again this is done with AND gate 37. In view of the state of flip-flops 30, 31, 33 and 34, the signals on input lines 37$b$–37$e$, namely, signals 30, 31, 34 and $\overline{33}$, are at the "1" level. The scan picture beneath the waveforms in FIG. 5 shows that the scan has intercepted a flag 15 at the time of clock pulse $e'$ so that no light is received by photomultiplier tube 24 at this time. Consequently, read amplifier 25 remains in the true state and its output signal 25, which is applied to input terminal 37$a$ of AND gate 37, is therefore at the "1" level. Thus, all inputs to gate 37 are at the "1" level, with the result that the SET signal produced by the gate in response thereto and applied to line 32$a$ at the input to flip-flop 32 is also at the "1" level. Hence, when clock pulse $e'$ is applied to line 32$b$, flip-flop 32 is set to the true state and its output signals 32 and $\overline{32}$ respectively go to the "1" and "0" levels.

Consequently, signal $\overline{32}$ applied to input line 47$c$ of AND gate 47 is at the "0" level and, therefore, since all inputs to gate 47 must be at the "1" level for it to produce an output, no reset signal is produced by gate 47 or applied to line 43$c$ of scan control flip-flop 43. As a result, the scan control flip-flop remains on and the scanning spot of light continues across the film. The data in the first row of the code block (see FIG. 1) is now strobed or read at clock times $f'$ through $m'$ for the first character in the data row.

With flip-flop 32 in a true state at this time and, therefore, with signal 32 applied to input line 44$a$ of modulus 7 counter at the "1" level, the modulus 7 counter is "enabled" and will therefore count the bits of the data character being read. In other words, in the interval between clock pulses $f'$–$m'$, the counter will advance to its next state with each succeeding clock pulse, the binary signal pattern produced at output lines 44$e$–44$k$ of the counter in response to each of the abovesaid clock pulses indicating which of the data bits in the code is being strobed or scanned at that particular time. Stated differently, the counter, as its name implies, counts the data bits as the clock pulses occur, the count being provided by the pulse patterns successively produced at output lines 44$e$–44$k$. Finally, when clock pulse $m'$ occurs, signal 44 out of the conter, which is then at a "1" level, is returned to a "0" level and this, in turn, resets the counter so that it will be ready to count the bits of the next character to be read. It will immediately be recognized that the combination of the bit count and the state of the read amplifier is enough to indicate whether a bit position on the film is opaque or transparent. In other words, by feeding the pulse patterns on lines 44$e$–44$k$ and signals 25 and $\overline{25}$ out of the read amplifier to external circuitry, a pulse pattern can ultimately be obtained that corresponds to the character being read out, that is, to the sequence of opaque and transparent bits being scanned on the film.

When signal 44 goes to the "1" level, namely, at the time of occurrence of clock pulse $l'$, the two inputs to AND gate 49 are then both at the "1" level, with the result that the SET signal on line 45$a$ of one-shot multivibrator 45 also goes to the "1" level. Consequently, when the next clock pulse is applied to input line 45$b$ of the multivibrator, namely, clock pulse $m'$, signal 45 out of the multivibrator goes to the "1" level and it stays at that level for a predetermined interval of time as shown in FIG. 5. Signal 45 is applied to modulus 7 counter where it inhibits the counter from registering any further counts during this interval.

It will be noted that the inputs to AND gate 39 are the same as those for AND gate 49, namely, signals 44 and $\overline{33}$. Hence, gate 39 is triggered to the true state at the same time gate 49 goes to the true state, with the result that the SET signal applied to flip-flop 33 via line 33$a$ also goes to the "1" level at this time. Consequently, when clock pulse $m'$ occurs, flip-flop 33 is set to the true state, which means that signals 33 and $\overline{33}$ therefrom respectively go to the "1" and "0" levels.

Considering now AND gates 50 and 51, whenever either AND gate 50 or AND gate 51 goes to the true state, clock pulse generator 35 is synchronized to the rise in the resulting output signal to insure that the clock pulses out of generator 35 will occur in the middle of bits being read. Synchronization takes place either through gate 50 when signals 45 and 25 are both at the "1" level or through gate 51 when signals 30, $\overline{31}$ and 25 are all at the "1" level. Referring to these waveforms in FIG. 5, it will be seen that synchronization through AND gate 50 occurs between clock pulses $n'$ and $p'$ since it is during this interval that the beam crosses over from transparent marker 13$a$ to opaque marker 13$b$ in the code block shown in FIG. 1. Consequently, it is during this interval that signal 25 out of the read amplifier goes to the "1" level, specifically, at the time of the abovesaid crossover, and when it does both signals 45 and 25 at the input to gate 50 are then at the "1" level, the result being, as mentioned above, the synchronization of clock pulse generator 35.

As was also mentioned, synchronization of the clock pulses similarly takes place when AND gate 51 goes to the true state and this occurs when signals 30, $\overline{31}$ and 25 are all at the "1" level. By again referring to the FIG. 5 waveforms, it will be seen that signals 30, $\overline{31}$ and 25 are all at the "1" level in the interval between clock pulses $c'$ and $d'$. More particularly, for the reasons previously given, signals 30 and $\overline{31}$ are at the "1" level and signal 25 goes to the "1" level when the beam encounters and crosses over the boundary of frame marker 14. Thus, clock pulse generator 35 is synchronized at the beginning of frame marker 14 when the first character is to be read should a flag 15 be present and by the re-synchronizing marker (columns 13*a* and 13*b* in FIG. 1) which occurs between the first and second characters. Synchronization of the clock pulses is important because they are not only used in the scan control logic but also for the control of the rest of the system to which this particular scanning system might relate. By synchronizing the clock with the data, slight variations in scan linearity, film size, shrinkage, etc., may be accommodated.

Returning now to a scan of the bits in the second character, which occurs between clock pulses $p'$ and $w'$, as the spot of light continues to move across the film, it will intercept the first bit of the second character between the times of occurrence of clock pulses $p'$ and $q'$. Thus, from this time on, read amplifier 25 will go to a true or false state depending on whether the bits successively intercepted by the spot of light are opaque or transparent, respectively. Stated differently, starting with clock pulse $q'$, the state of read amplifier signals 25 and $\overline{25}$ will indicate the state of the bits recorded on the film. Simultaneously, that is, during the interval between clock pulses $q'$ through $w'$, modulus 7 counter 44 is again enabled and will therefore provide a count of the bits being strobed or scanned as before. More specifically, as may be seen from waveform 45, the inhibit signal is applied to counter 44 only until the start of the first bit in the second character, after which the counter is again permitted to count. As was done before in connection with the bits constituting the first coded character the counts developed by counter 44 at its output lines 44*e*–44*k* and the fluctuations of signals 25 and $\overline{25}$ out of the read amplifier are fed to the external circuitry whereat a pulse pattern is ultimately obtained that identifies the character being read out.

At clock pulse time $w'$, signal 44 out of the counter is again at a "1" level and this, in conjunction with the fact that signal 33 out of flip-flop 33 is also at a "1" level, indicates that the second character of the data row being scanned has been fully read, at which time the long scan is stopped and caused to retrace in order to find the next data row in accordance with the present invention. This is all accomplished by means of AND gate 48 to which signals 33 and 44 are applied and in response to which the gate applies a RESET signal on input line 43*c* of scan control flip-flop 43. In response to the reset signal, flip-flop 43 goes to the false state, thereby causing signal 43 to go to the "0" level. As was explained earlier in the description, when this occurs, the inputs to ramp generator 55 and unblanking network 59 drop to the "0" level so that the cathode-ray tube beam is turned off and its position retraces back to the quiescent position.

It should also be noted that at clock time $w'$, AND gate 38 is also true since its inputs, namely, signals 33 and 44 are at the "1" level. Accordingly, flip-flop 32 is set to the false state at the time of clock pulse $w'$, in consequence of which signals 32 and $\overline{32}$ respectively go from their previous levels to the "0" and "1" levels. Since signal 32 is applied to the "enabling" line (line 44*a*) of modulus 7 counter 44, the reversal in the state of flip-flop 32 has the effect of disenabling the counter and thereby stops it from making any further counts. In short, at clock pulse time $w'$, counter 44 is inactivated.

It will be recognized that the beam travels a further distance in reading a complete data row than it does when it searches for a flag 15. Consequently, the time required for retrace is longer and this is shown in waveform 58 by the fact that it doesn't rise to the "1" level again until midway between clock pulses $z'$ and $b''$, three and a half clock pulse intervals after the occurrence of clock pulses $w'$. Earlier, at the end of the short scan or trace which ended with clock pulse $f$, signal 58 rose again to the "1" level after only one and a half clock pulse intervals, that is, midway between clock pulses $g$ and $b'$. This brief description of comparative retrace times should clearly indicate that a considerable amount of time can be saved by means of the dual scanning of the present invention. Of course, additional time is saved by the fact that only short scans are employed a good part of the time. As mentioned before, therefore, the present invention permits considerably higher average film speeds.

When signal 58 once again goes to the "1" level in the interval between clock pulses $z'$ and $b''$, AND gate 46 also goes to the true state so that the SET signal applied to input line 43*a* of the scan control flip-flop once again is at the "1" level. Hence, when clock pulse $b''$ occurs and is applied to line 43*b*, flip-flop 43 is triggered to the true state once again, thereby shifting signal 43 produced by the flip-flop and applied to both ramp generator 55 and unblanking network 59 to the "1" level. In accordance with previous explanations relating to the above-described short and long scans, this starts the scan cycle all over again. However, having thoroughly described and explained the logic involved for the short and long scans, it is felt that any further description would be redundant. Accordingly, suffice it to say that the scanning system of the present invention, as shown and described herein, will continue to operate in the described manner until the SCAN ON signal is turned off, that is, reduced to the "0" level.

Although a particular arrangement of the invention has been illustrated and described herein, it is not intended that the invention be limited thereto. Thus, for example, if a different code were used, then the system logic would have to be adapted to the new code. Again by way of example, if a punched tape were used instead of photographic film, the logic circuitry would once again require some modification. Accordingly, the invention should be considered to include any and all modifications, alterations or equivalent arrangements falling within the scope of the annexed claims.

Having thus described the invention, what is claimed is:

1. Apparatus for reading blocks of information optically recorded on a first area of a storage medium in straight rows and marks optically recorded on a second area of the storage medium adjacent to and in line with the respective rows comprising: a light source with a beam of light directed upon the surface of the storage medium to sense the rows of information and the marks optically recorded thereon; means for introducing a relative movement between the storage medium and the beam in a direction transverse to the rows; means for directing the beam within the first area in a short, straight trajectory that crosses each mark in succession without extending substantially into the adjacent row of information within the second area; and means responsive to the sensing of a mark by the beam while in a short trajectory for continuing the trajectory of the beam through the second area in a straight line that crosses the row of information adjacent to the sensed mark.

2. The combination of claim 1, in which the means for directing the beam is a ramp generator, the output of which deflects the beam parallel to the rows of information, the ramp generator repeatedly producing an output for a first predetermined period of time corresponding to short trajectory and producing an output extending beyond the first predetermined period of time to the end of a second predetermined period of time corresponding to the continued trajectory when the beam senses the presence of a mark.

3. Apparatus for reading binary-coded data recorded on a roll of photographic film in the form for blocks of transparent and opaque data marks arranged in straight rows perpendicular to the length of film and flag marks recorded on the film in front of and is a straight line with each row comprising: a beam of light focused as a spot on the surface of the film; means for transporting the film past the beam of light; a ramp generator repeatedly producing a voltage that rises continuously from an initial point until turned off, after which it returns to the initial point; means for repeatedly deflecting the spot transverse to the length of the film responsive to the voltage produced by the ramp generator beginning at a point in front of the rows; means responsive to the sensing by the beam of the absence of a flag mark for turning off the ramp generator after a first time interval corresponding to a short trajectory that substantially excludes the blocks; means responsive to the sensing by the beam of the presence of a flag mark for turning off the ramp generator after a second time interval larger than the first time interval and corresponding to a long trajectory that includes an entire row of data marks; and means for sensing changes in intensity of the beam of light passing through the surface.

4. The apparatus of claim 3, in which frames of graphic information are recorded alongside of the blocks of data, a continuous bar forming one side of the block of data extends along the complete length of each frame, the spot is deflected in its short trajectory to cross the bar, and means are provided for registering the crossing of the frame bar by the beam.

5. The apparatus of claim 4, in which the ramp generator is operated under the control of a source of clock pulses and a synchronizing pulse is generated responsive to each crossing of the frame bar by the spot, the source being synchronized to the synchronizing pulses.

6. The apparatus of claim 5, in which each data block is divided along the length of the frame into two groups separated by a space and a continuous second bar forming part of the block; the spot is deflected in its expanded trajectory to cross the second bar; and a synchronizing pulse is generated responsive to each crossing of the second bar by the spot, the source of clock pulses being synchronized to the synchronizing pulses.

References Cited

UNITED STATES PATENTS

| | | | |
|---|---|---|---|
| 2,838,602 | 6/1958 | Sprick | 178—15 |
| 3,159,743 | 12/1964 | Brouillette et al. | 235—198 |
| 3,223,973 | 12/1965 | Chatten | 340—146.3 |

MAYNARD R. WILBUR, *Primary Examiner.*

DARYL W. COOK, *Examiner.*

J. I. SCHNEIDER, *Assistant Examiner.*

UNITED STATES PATENT OFFICE

CERTIFICATE OF CORRECTION

Patent No. 3,342,978 September 19, 1967

John F. Cameron et al.

It is hereby certified that error appears in the above numbered patent requiring correction and that the said Letters Patent should read as corrected below.

Column 3, line 6, for "37c" read -- 37e --; column 4, line 10, for "and lines" read -- the lines --; line 43, for "AND gotes' read -- AND gates --; column 7, line 5, strike out "and "1" "; line 18, for "react" read -- reset --; column 10, line 71, for "to short" read -- to the short --; column 11, line 2, for "form for blocks" read -- form of blocks --; line 5, for "is" read -- in --.

Signed and sealed this 29th day of October 1968.

(SEAL)
Attest:

Edward M. Fletcher, Jr.
Attesting Officer

EDWARD J. BRENNER
Commissioner of Patents